US012236810B2

(12) United States Patent
Yeo

(10) Patent No.: US 12,236,810 B2
(45) Date of Patent: Feb. 25, 2025

(54) SYSTEM FOR DRY EXECUTION OF FINISHING MATERIAL

(71) Applicant: EUTO INC., Yongin-si (KR)

(72) Inventor: Yong Soo Yeo, Yongin-si (KR)

(73) Assignee: EUTO INC., Yongin-si (KR)

( * ) Notice: Subject to any disclaimer, the term of this patent is extended or adjusted under 35 U.S.C. 154(b) by 0 days.

(21) Appl. No.: 18/011,423

(22) PCT Filed: Nov. 28, 2022

(86) PCT No.: PCT/KR2022/018930

§ 371 (c)(1),
(2) Date: Dec. 19, 2022

(87) PCT Pub. No.: WO2023/167392

PCT Pub. Date: Sep. 7, 2023

(65) Prior Publication Data

US 2024/0127721 A1 Apr. 18, 2024

(30) Foreign Application Priority Data

Mar. 3, 2022 (KR) ........................ 10-2022-0027169

(51) Int. Cl.
*E04F 13/08* (2006.01)
*E04F 13/14* (2006.01)
*G09F 9/33* (2006.01)

(52) U.S. Cl.
CPC ............ *G09F 9/33* (2013.01); *E04F 13/0851* (2013.01); *E04F 13/14* (2013.01); *E04F 13/083* (2013.01)

(58) Field of Classification Search
CPC ......... E04F 13/07; E04F 13/072; E04F 13/08; E04F 13/0801; E04F 13/0803; E04F 13/0805; E04F 13/81; E04F 13/0812; E04F 13/0814; E04F 13/0816; E04F 13/0819; E04F 13/083; E04F 13/0851; E04F 13/0858; E04F 13/086; E04F 13/0862; E04F 13/0871; E04F 13/0873; E04F 13/09; E04F 13/14; E04F 13/145
See application file for complete search history.

(56) References Cited

U.S. PATENT DOCUMENTS 1,552,394 A * 9/1925 Cowing .............. E04F 13/0803 52/389
4,803,821 A * 2/1989 Funaki ................ E04F 13/0864 52/387
4,890,433 A * 1/1990 Funaki ................ E04F 13/0801 52/510

(Continued)

FOREIGN PATENT DOCUMENTS

| | | | |
|---|---|---|---|
| FR | 2646864 A * | 11/1990 | ............... E04C 1/39 |
| FR | 3102231 A1 * | 4/2021 | .......... E04F 13/0871 |
| KR | 101334320 | 11/2013 | |

*Primary Examiner* — Kyle J. Walraed-Sullivan
(74) *Attorney, Agent, or Firm* — Schroeder Law PC

(57) ABSTRACT

A system for dry execution of finishing material according to an aspect of the present invention may comprise a fixing bracket fixed to an outer wall of a building, a brick which is provided on one surface of the fixing bracket and of which one surface facing the fixing bracket an insertion groove is formed in to be coupled into the fixing bracket in a fitting manner, and LEDs provided on the brick to emit light.

8 Claims, 10 Drawing Sheets

(56) References Cited

U.S. PATENT DOCUMENTS

| | | | | | |
|---|---|---|---|---|---|
| 4,916,875 | A * | 4/1990 | Kashiwagi | E04F 13/0851 | 52/302.3 |
| 4,987,712 | A * | 1/1991 | Mancuso | E04F 13/0862 | 52/387 |
| 5,029,425 | A * | 7/1991 | Bogataj | E04F 13/0862 | 52/510 |
| 5,860,257 | A * | 1/1999 | Gerhaher | E04F 10/10 | 52/235 |
| 6,421,974 | B1 * | 7/2002 | Whitehouse | E04F 13/147 | 52/510 |
| 6,748,709 | B1 * | 6/2004 | Sherman | E04B 2/96 | 52/235 |
| 9,016,020 | B1 * | 4/2015 | Yang | E04F 13/0803 | 52/511 |
| 10,138,635 | B1 * | 11/2018 | Yeo | E04F 13/083 | |
| 2011/0047916 | A1 * | 3/2011 | Muller | E04F 13/0819 | 52/477 |
| 2016/0208497 | A1 * | 7/2016 | Yang | B32B 3/06 | |
| 2023/0265662 | A1 * | 8/2023 | Bafna | A47G 1/1606 | 52/489.1 |

* cited by examiner

SYSTEM FOR DRY EXECUTION OF FINISHING MATERIAL

TECHNICAL FIELD

The present invention relates to a system for dry execution of finishing material, more specifically, a system for dry execution of finishing material in which an LED is embedded and capable of transmitting a picture.

BACKGROUND ART

In general, there are a wet method and a dry method as a finishing method for attaching and fixing a finishing material such as pottery, ceramic, stone, terracotta panel, or brick to the interior or exterior wall of a building during interior and exterior construction of a building.

The dry method is to install a separate fixing member made of metal between the interior and exterior walls and the finishing material to attach the finishing material to the interior and exterior walls of the building with the wall isolated from the finishing material, which brings the advantages that the construction time is short, the work is convenient, and the insulation configuration is easy. Therefore, in recent years, construction methods for fixing exterior materials such as bricks using the dry method have been widely performed.

However, although finishing materials such as bricks can be inserted into a separate fixing member made of metal, etc., shaking occurs while the finishing material is inserted into the fixing member, so a secondary fixing operation of the finishing material with the fixing member while the finishing material is inserted into the fixing member is required.

In this way, as the secondary fixing work for fixing the exterior material to the fixing member is required, there are problems in that labor costs and material costs increase and construction time becomes longer.

In addition, when the secondary fixing work was performed by a non-skilled person and the construction was not precise, there was a problem that the finish of the building was not neat.

On the other hand, since most of the existing building advertisements use monitors or lighting, there is a problem that the advertisement board itself disturbs the city view.

Therefore, it is necessary to develop a technology by which the finishing material is provided with maintaining the shape of the finishing material at normal times but is able to transmit a screen (figure) during advertisement.

DISCLOSURE

Object of Invention

The present invention has been devised to solve the above problems, and an object of the present invention is to provide a system for dry execution of finishing material capable of transmitting media as the finishing material itself becomes a screen.

In addition, it is to provide a system for dry execution of finishing material that can transmit images by connecting to the wired and wireless Internet.

In addition, it is to provide a system for dry execution of finishing material that does not require a secondary fixing operation for fixing the finishing material to the fixing member and can install the finishing material only by dry construction.

Technical Solution

In order to achieve the above objects, a system for dry execution of finishing material according to an embodiment of the present invention may comprise: a fixing bracket fixed to an outer wall of a building; a brick which is provided on one surface of the fixing bracket and of which one surface facing the fixing bracket an insertion groove is formed in to be coupled into the fixing bracket in a fitting manner; and an LED provided on the brick to emit light.

The brick may comprise a first coupling part which the insertion groove is formed and is coupled to the fixing bracket; and a second coupling part which is provided to correspond to the first coupling part and in which the LED is embedded.

The first coupling part may comprise a body formed longitudinally in an up and down direction; a plurality of first extending protrusions extending toward the fixing bracket so as to form a vertical line with the body from one surface of the fixing bracket of the body; a plurality of first coupling protrusions extending downward from one end of the plurality of first extending protrusions and forming a vertical line with the first extending protrusion; a plurality of second coupling protrusions extending upward from one end of the plurality of first extending protrusions and forming a vertical line with the first extending protrusion; and an opening formed between the first coupling protrusion and the second coupling protrusion that are facing each other to allow a portion of the fixing bracket to be inserted into the insertion groove.

The second coupling part may comprise a pair of second extending protrusions provided respectively at the uppermost and lowermost ends of the body and extending in a direction corresponding to the first extending protrusion; a pair of third extending protrusions extending upward or downward from one end of the second extending protrusion to form a vertical line with the second extending protrusion; and a coupling space formed by the body, the pair of second extending protrusions and the pair of third extending protrusions, and wherein the LED is provided on an upper surface of the second extending protrusion provided at the lowermost end of the body, and wherein an upper part of the LED is provided with a light receiving plate for receiving light emitted from the LED.

The first coupling part may comprise a body formed longitudinally in an up and down direction; a plurality of first extending protrusions extending toward the fixing bracket so as to form a vertical line with the body from one surface of the fixing bracket of the body; a plurality of first coupling protrusions extending downward from one end of the plurality of first extending protrusions and forming a vertical line with the first extending protrusion; and an opening formed between the first coupling protrusion and the first extending protrusion to allow a portion of the fixing bracket to be inserted into the insertion groove.

The second coupling part may comprise a second extending protrusion provided at the uppermost end of the body and extending in a direction corresponding to the first extending protrusion; a third extending protrusion extending downward from one end of the second extending protrusion to form a vertical line with the second extending protrusion; a coupling space which is provided on an inner surface where the second extending protrusion and the third extending protrusion come into contact with each other and in which the LED is provided; and a front reflective surface which is provided to be inclined on one side of the body to reflect light emitted from the LED.

The brick may comprise a first coupling part which the insertion groove is formed therein to be combined with the fixing bracket, and of which upper end is provided with the LED, and wherein the first coupling part may comprise a body formed longitudinally in an up and down direction; a plurality of first extending protrusions extending toward the fixing bracket so as to form a vertical line with the body from one surface of the fixing bracket of the body; a plurality of first coupling protrusions extending downward from one end of the plurality of first extending protrusions and forming a vertical line with the first extending protrusion; an opening formed between the first coupling protrusion and the first extending protrusion to allow a portion of the fixing bracket to be inserted into the insertion groove; a seating protrusion extending upward from the first coupling protrusion located at an uppermost end; a seating space which is provided on an inner surface where the body and the seating protrusion come into contact with each other and which the LED is coupled with; and a rear reflection surface that extends from a lower end of the body to an outside of the brick and reflects light emitted from the LED provided in another brick adjacent to a lower direction.

The fixing bracket may comprise a fixing plate which is provided with a plurality of flat portions provided in a plate shape and is provided with a projection extending from the flat portion to be positioned between the plurality of flat portions and protruding in a direction of a building relatively more than the flat portion; an insertion protrusion provided on one side of the brick side of the flat portion and inserted into the insertion groove; an elastic body provided on one side of the brick side of the flat portion so as to be located at a lower end of the insertion protrusion and elastically supporting the insertion protrusion; and a pressure protrusion which is provided on one side of the brick side of the flat portion so as to be located at an upper end of the insertion protrusion and which comes in contact with the first coupling protrusion to push the brick in an outer direction the building.

In addition, a system for dry execution of finishing material according to another embodiment of the present invention in order to achieve the above objects may comprise: a fixing bracket fixed to an outer wall of a building; a brick which is provided on one surface of the fixing bracket and of which one surface facing the fixing bracket an insertion groove is formed in to be coupled into the fixing bracket in a fitting manner; and an LED provided on one surface of the fixing bracket and positioned between a pair of the bricks that are vertically adjacent to each other to emit light.

The brick may comprise a first coupling part which the insertion groove is formed and coupled to the fixing bracket; and a second coupling part which is provided to correspond to the first coupling part and allows light emitted from the LED to be reflected.

The first coupling part may comprise a body formed longitudinally in an up and down direction; a plurality of first extending protrusions extending toward the fixing bracket so as to form a vertical line with the body from one surface of the fixing bracket of the body; a first coupling protrusion extending downward from one end of the first extending protrusion and forming a vertical line with the first extending protrusion; and an opening formed between the first extending protrusion and the first coupling protrusion to allow a portion of the fixing bracket to be inserted into the insertion groove.

The fixing bracket may comprise a fixing plate which is provided with a plurality of flat portions provided in a plate shape and is provided with a projection extending from the flat portion to be positioned between the plurality of flat portions and protruding in a direction of a building relatively more than the flat portion; an insertion protrusion provided on one side of the brick side of the projection and inserted into the insertion groove; an elastic body provided on one side of the brick side of the projection so as to be located at a lower end of the insertion protrusion and elastically supporting the insertion protrusion; a first pressure protrusion which is provided on one side of the brick side of the projection so as to be located at an upper end of the insertion protrusion and which comes in contact with the first extending protrusion to push the brick in an outer direction the building; and a second pressure protrusion which is provided on one side of the brick side of another projection so as to be located at a lower end of the insertion protrusion and which comes in contact with another first extending protrusion to push the brick in an outer direction the building.

In the system, a mounting bracket provided between a pair of the adjacent bricks to which the LED is mounted may be further provided, and the mounting bracket may comprise a first portion in contact with the flat portion; a second portion extending from an upper end of the first portion; and a third portion extending from a lower end of the first portion.

The fixing bracket comprises a fixing plate which is provided with a plurality of flat portions provided in a plate shape and is provided with a projection extending from the flat portion to be positioned between the plurality of flat portions and protruding in a direction of a building relatively more than the flat portion; an insertion protrusion provided on one side of the brick side of the projection and inserted into the insertion groove; an elastic body provided on one side of the brick side of the projection so as to be located at a lower end of the insertion protrusion and elastically supporting the insertion protrusion; a first pressure protrusion which is provided on one side of the brick side of the projection so as to be located at an upper end of the insertion protrusion and which comes in contact with the first extending protrusion to push the brick in an outer direction the building; and a second pressure protrusion which is provided on one side of the brick side of the flat portion so as to be located at a lower end of the insertion protrusion and which comes in contact with another first extending protrusion to push the brick in an outer direction the building.

In the system, a mounting bracket provided between a pair of the adjacent bricks to which the LED is mounted may be further provided, and the mounting bracket may comprise a first portion in contact with the flat portion; a second portion extending from an upper end of the first portion and located at a lower portion of the second pressure protrusion; a third portion extending from a lower end of the first portion; a fourth portion extending downward from the second portion; a fifth portion extending toward the brick from the fourth portion; a sixth portion extending downward from the third portion; and a seventh portion extending toward the brick from the sixth portion.

Advantageous Effects

According to the system for dry execution of finishing material of the present invention, the finishing material itself becomes a screen and can transmit media.

In addition, images can be transmitted by connecting to the wired or wireless Internet.

In addition, there is no need for secondary fixing work to fix the finishing material to the fixing member, and the finishing material can be installed only by dry construction.

DETAILED DESCRIPTION OF THE INVENTION

Hereinafter, a system for dry execution of finishing material according to one example of the present invention will be described with reference to the accompanying drawings in detail.

Figure 1:
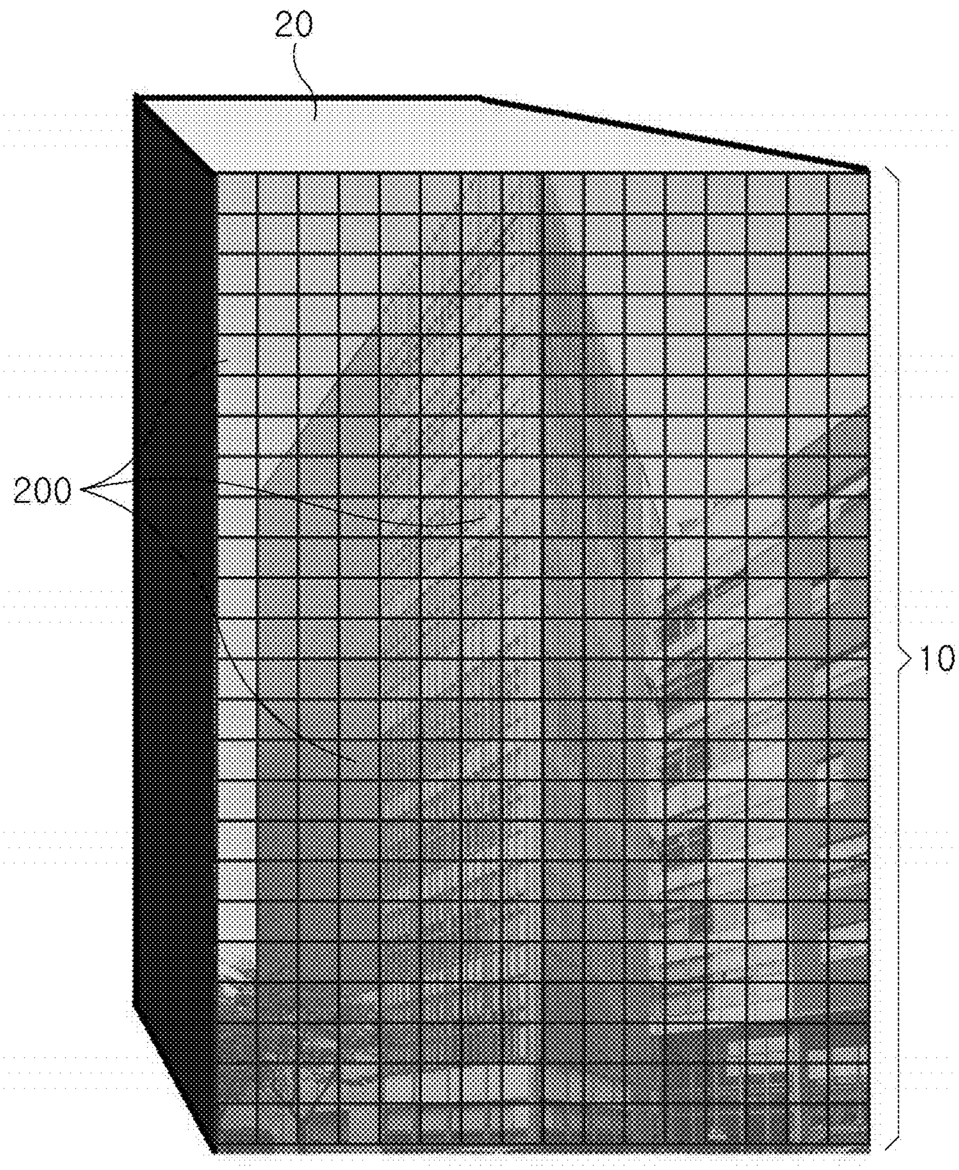
FIG. 1 is a view showing that a system for dry execution of finishing material according to an embodiment of the present invention is applied.
Figure 2:
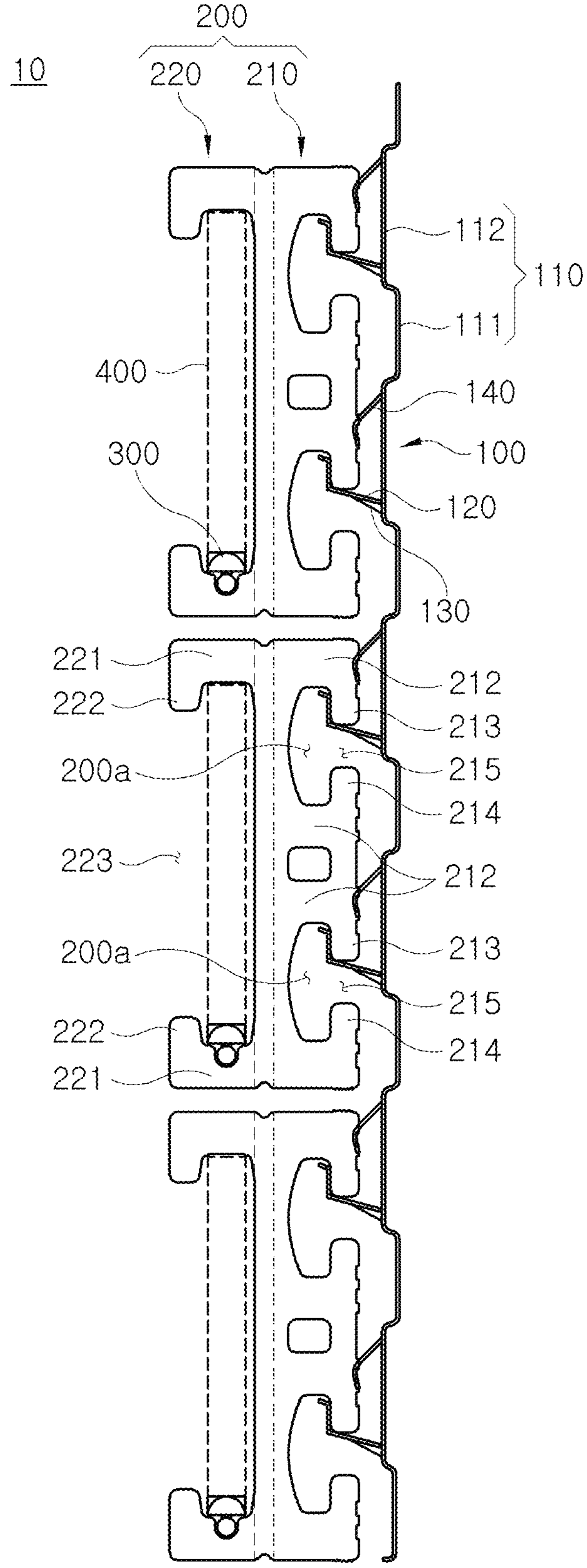
FIG. 2 is a sectional view of the system for dry execution of finishing material shown in FIG. 1.

FIG. 1 is a view showing that a system for dry execution of finishing material according to an embodiment of the present invention is applied, and FIG. 2 is a sectional view of the system for dry execution of finishing material shown in FIG. 1.

Referring to FIGS. 1 and 2, a system 10 for dry execution of finishing material according to an embodiment of the present invention may comprise a fixing bracket 100 fixed to an outer wall of a building 20 and a brick 200 which is provided on one surface of the fixing bracket 100 and of which one surface facing the fixing bracket 100 an insertion groove 200*a* is formed in to be coupled into the fixing bracket 100 in a fitting manner.

The fixing bracket 100 is used to fix the brick 200 by a dry method and may be manufactured through a method such as PVC injection or aluminum extrusion and fixed to the outer wall of the building 20.

A plurality of bricks 200 are provided in the fixing bracket 100 to cover the fixing bracket 100 fixed to the outer wall of the building 20 and may be formed in a terracotta manner.

The terracotta brick 200 is obtained by extruding clay into a predetermined shape and firing at a high temperature of about 1,000 to 1,450° C.

Accordingly, it not only has excellent aesthetics and moldability, but also its materials are abundant and homogeneous, so it can replace natural stone finishing materials, and at least one hollow part (no reference number assigned) may be formed therein to reduce weight.

In addition, LEDs 300 are provided on each of the plurality of bricks 200 so that photos or videos are transmitted to the outer wall of the building 20, and when the LEDs 300 emit light, advertising or publicity is enabled, and when the LED 300 does not emit light, it roles as the exterior material of the building 20.

To this end, the brick 200 may comprise a first coupling part 210 which the insertion groove 200*a* is formed and coupled to the fixing bracket 100, and a second coupling part 220 which is provided to correspond to the first coupling part 210 and in which the LED 300 is embedded to emit light.

In addition, the first coupling part 210 may comprise a body 211 formed longitudinally in an up and down direction; a plurality of first extending protrusions 212 extending toward the fixing bracket 100 so as to form a vertical line with the body 211 from one surface of the fixing bracket 100 of the body 211; a plurality of first coupling protrusions 213 extending downward from one end of the plurality of first extending protrusions 212 and forming a vertical line with the first extending protrusion 212; a plurality of second coupling protrusions 214 extending upward from one end of the plurality of first extending protrusions 212 and forming a vertical line with the first extending protrusion 212; and an opening formed between the first coupling protrusion 213 and the second coupling protrusion 214 that are facing each other to allow a portion of the fixing bracket 100 to be inserted into the insertion groove 200*a*.

The length of the body 211 may be provided in various lengths such as 95 mm to 195 mm depending on the overall size of the brick 200, and the first extending protrusion 212, the first coupling protrusion 213 and the second coupling protrusion 214 may increase or decrease in number according to the length of the body 211.

Here, the insertion groove 200*a* and the opening 215 are always provided in the same size regardless of the length of the body 211 and the number of the first extending protrusions 212, the first coupling protrusions 213, and the second coupling protrusions 214, so that it can be easily combined with the fixing bracket 100 regardless of the size of the brick 200.

Meanwhile, the second coupling part 220 may comprise a pair of second extending protrusions 221 provided respectively at the uppermost and lowermost ends of the body 211 and extending in a direction corresponding to the first extending protrusion 212, a pair of third extending protrusions 222 extending upward or downward from one end of the second extending protrusion 221 to form a vertical line with the second extending protrusion 221, and a coupling space 223 formed by the body 211, the pair of second extending protrusions 221 and the pair of third extending protrusions 222.

The coupling space 223 comprises an LED 300 that is provided on the upper surface of the second extending protrusion 221 provided at the lowermost end of the body 211 and that emits light, and a light receiving plate 400 that is provided on the upper portion of the LED 300 and that receives light emitted from the LED, and the light emitted from the LED 300 is diffused through the light receiving plate 400, thereby increasing the transmission effect.

Here, the LED 300 and the light receiving plate 400 are not coupled through a separate fixing member or adhesive, but are combined into the coupling space 223 formed by a body 211, a pair of second extending protrusions 221 and a pair of third extending protrusions 222 through the fitting method, thus it is possible to increase the workability and maintenance convenience.

On the other hand, the fixing bracket 100 may comprise a fixing plate 110 which is provided with a plurality of flat portions 100 provided in a plate shape and is provided with a projection 112 extending from the flat portion 111 to be positioned between the plurality of flat portions 111 and protruding in a direction of a building 20 relatively more than the flat portion 111, an insertion protrusion 120 provided on one side of the brick side 200 of the flat portion 111 and inserted into the insertion groove 200*a*, an elastic body 130 provided on one side of the brick side 200 of the flat portion 111 so as to be located at a lower end of the insertion protrusion 120 and elastically supporting the insertion protrusion 120, and a pressure protrusion 140 which is provided on one side of the brick side 200 of the flat portion 111 so as to be located at an upper end of the insertion protrusion 120 and which comes in contact with the first coupling protrusion 213 to push the brick 200 in an outer direction the building 20.

As the fixing plate 110 is provided alternately with the flat portion 111 and the projection 112, the structural rigidity can be relatively increased compared to that provided with only the flat portion 111, and the fixing plate 110 may be fixed to the building 20 by fastening a fixing member (not shown) such as pieces to the projection 112.

And a pair of fixing plates 110 adjacent in an up and down direction overlap between the projections 112 so that the projection 112 of the fixing plate 110 located in the upper direction is configured to rest on the projection 112 of the fixing plate 110 located in the lower direction (112).

In addition, the projection 112 is provided with a controller 600 connected to the LED 300 through a cable 500 to supply power and control the LED 300. The controller 600 is provided individually for each LED 300, so that light suitable for the photo or video to be transmitted through the LED 300 can be individually emitted.

On the other hand, the insertion protrusion 120 is provided in a 'L' shape and is inserted through the opening 215, and then is seated in the insertion groove 200*a* and abuts one surface of the insertion groove 200*a* side of the first coupling protrusion 213, and supports the bottom surface so that the brick 200 is configured to rest on the fixing bracket 100 by the insertion protrusion 120, and the insertion protrusion 120 can be moved elastically by the elastic body 130 when an impact is applied to the brick 200, thus damage of the fixing bracket 100 or the brick 200 can be reduced.

The pressure protrusion 140 exerts a force to push the brick 200 outward of the building 20, thereby increasing the bonding strength of the brick 200 together with the insertion protrusion 120.

Next, a modified example of the system 10 for dry execution of finishing material according to an embodiment of the present invention will be described. In the following description, only parts different from those of the above-described embodiment are described in detail, and detailed descriptions of the same or extremely similar parts are omitted.

Figure 3:
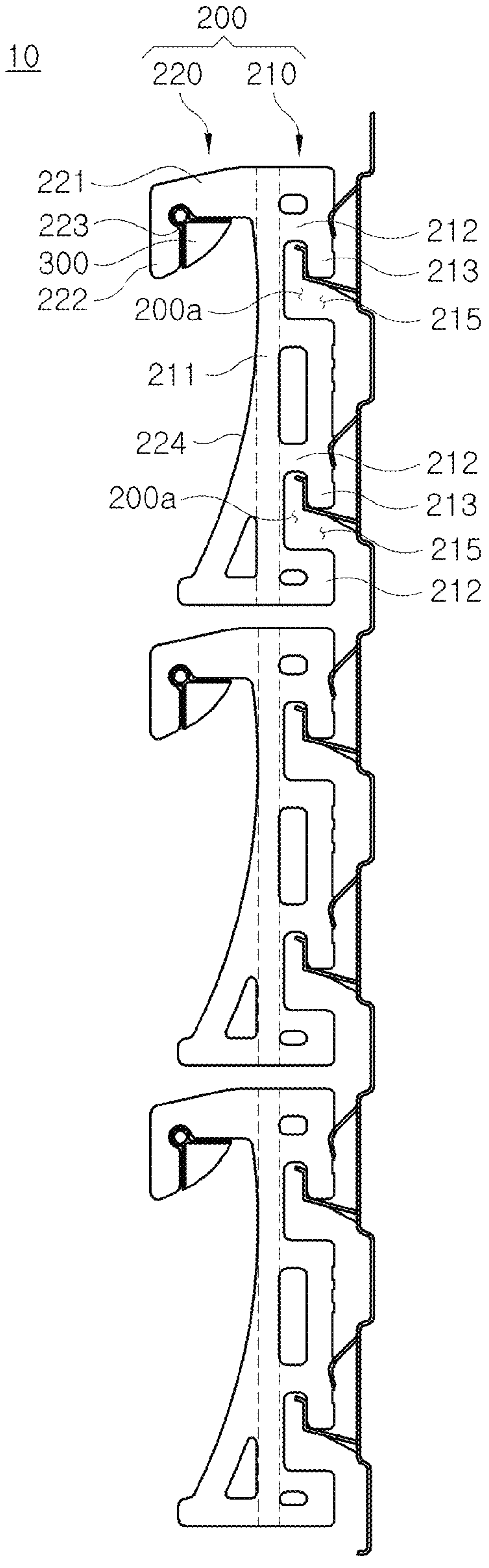
FIG. 3 is a sectional view showing a modified example of the system for dry execution of finishing material shown in FIG. 2.

FIG. 3 is a cross-sectional view showing a modified example of the system for dry execution of finishing material shown in FIG. 2.

Referring FIGS. 1 to 3, the system 10 for dry execution of finishing material according to an embodiment of the present invention may be provided with a fixing bracket fixed to an outer wall of a building 20, a brick 200 which is provided on one surface of the fixing bracket and of which one surface facing the fixing bracket an insertion groove 200 a is formed in to be coupled into the fixing bracket in a fitting manner, and an LED 300 provided on the brick 200 and emitting light, and the brick 200 is provided with a first coupling part 210 in which an insertion groove 200*a* is formed to be coupled to the fixing bracket, and with a second coupling part 220 which is provided to correspond to the first coupling part 210 and in which the LED 300 is embedded.

In addition, the first coupling part 210 may be provided with a body 211 elongated in the vertical direction, and a plurality of first extending protrusions 212 extending toward the fixing bracket to form a vertical line with the body 211 on one surface of the fixing bracket side of the body 211, and a plurality of first coupling protrusions 213 extending downward from one end of the plurality of first extending protrusions 212 and forming a vertical line with the first extending protrusion 212, and an opening 215 formed between the first coupling protrusion 213 and the first extending protrusion 212 to allow a portion of the fixing bracket to be inserted into the insertion groove 200*a*.

In addition, the second coupling part 200 may comprise a second extending protrusion 221 provided at the uppermost end of the body 211 and extending in a direction corresponding to the first extending protrusion 212, a third extending protrusion 222 extending downward from one end of the second extending protrusion 221 to form a vertical line with the second extending protrusion 221, a coupling space 223 which is provided on an inner surface where the second extending protrusion 221 and the third extending protrusion 222 come into contact with each other and in which the LED 300 is provided, and a front reflective surface 224 which is provided to be inclined on one side of the body 211 to reflect light emitted from the LED 300.

The LED 300 provided in the coupling space 223 emits light toward the rear, that is, in the inner direction of the building 20, and the light emitted from the LED 300 can be reflected outward to the building 20 through the front reflective surface 224.

Also, since the LED 300 is blocked from being exposed to the outside by the second extending protrusion 221 and the third extending protrusion 222, it can be blocked from being exposed to rainwater or direct sunlight in case of rain.

Next, another modified example of the system 10 for dry execution of finishing material according to an embodiment of the present invention will be described. In the following description, only parts different from those of the above-described embodiment are described in detail, and detailed descriptions of the same or extremely similar parts are omitted.

Figure 4:
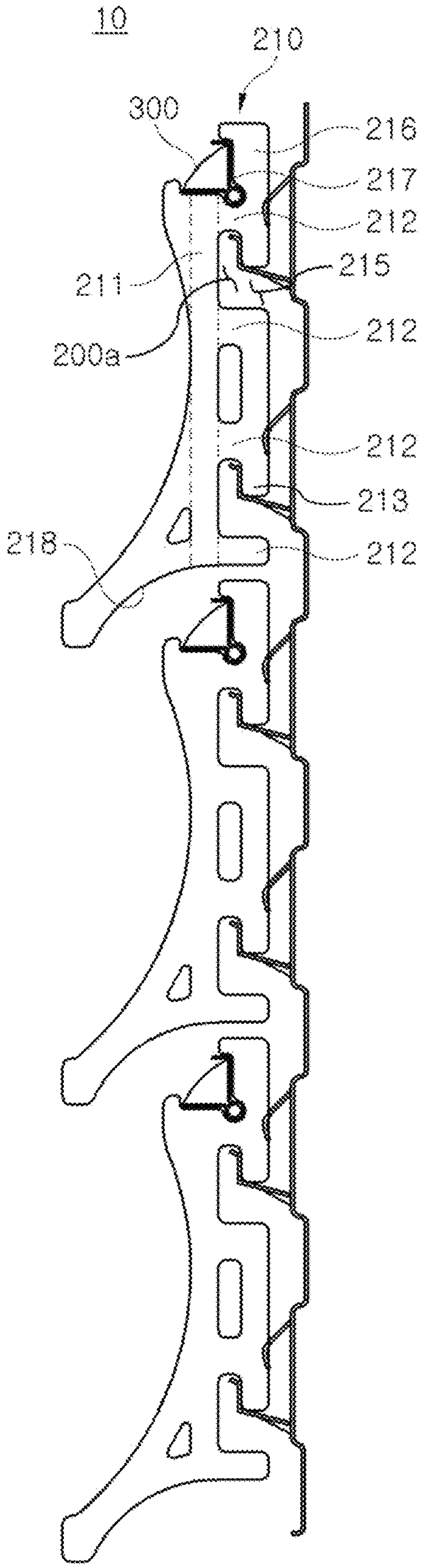
FIG. 4 is a sectional view showing another modified example of the system for dry execution of finishing material shown in FIG. 2.

FIG. 4 is a sectional view showing another modified example of the system for dry execution of finishing material shown in FIG. 2.

Referring FIGS. 1 to 4, the system 10 for dry execution of finishing material according to an embodiment of the present invention may be provided with a fixing bracket fixed to an outer wall of a building 20, a brick 200 which is provided on one surface of the fixing bracket and of which one surface facing the fixing bracket an insertion groove 200 a is formed in to be coupled into the fixing bracket in a fitting manner, and an LED 300 provided on the brick 200 and emitting light, and the brick 200 may comprise a first coupling part 210 which is formed an insertion groove 200*a* to be coupled to the fixing bracket, and of which upper end is provided with the LED.

In addition, the first coupling part 210 may be provided with a body 211 elongated in the vertical direction, and a plurality of first extending protrusions 212 extending toward the fixing bracket to form a vertical line with the body 211 on one surface of the fixing bracket side of the body 211, and a plurality of first coupling protrusions 213 extending downward from one end of the plurality of first extending protrusions 212 and forming a vertical line with the first extending protrusion 212, and an opening 215 formed between the first coupling protrusion 213 and the first extending protrusion 212 to allow a portion of the fixing bracket to be inserted into the insertion groove 200*a*, and a seating protrusion 216 extending upward from the first coupling protrusion 213 located at an uppermost end, and a seating space 217 which is provided on an inner surface where the body 211 and the seating protrusion 216 come into contact with each other and which the LED 300 is coupled with, and a rear reflection surface 218 that extends from a lower end of the body 211 to an outside of the brick 200 and reflects light emitted from the LED 300 provided in another brick 200 adjacent to a lower direction.

The LED 300 provided in the seating space 217 emits light in the forward direction, that is, in the outer direction of the building 20, and the light emitted from the LED 300 is reflected through the rear reflective surface 218 of another brick 200 adjacent to the upper direction.

In addition, the LED 300 is blocked from being exposed to the outside by the rear reflective surface 218 of another brick 200 adjacent to the upper direction, so that it can be blocked from being exposed to rainwater or direct sunlight in case of rain.

Next, a system for dry execution of finishing material according to another embodiment of the present invention will be described.

Figure 5:
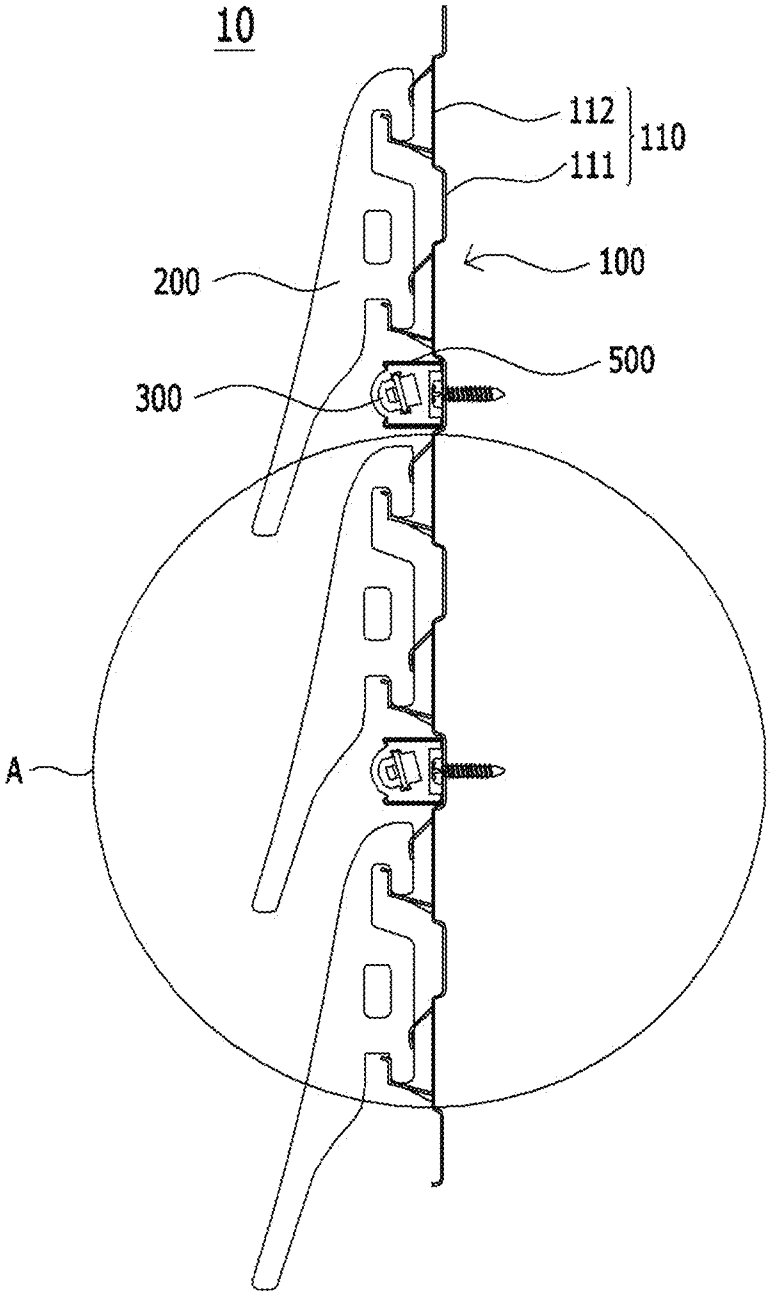
FIG. 5 shows a system for dry execution of finishing material according to another embodiment of the present invention.
Figure 6:
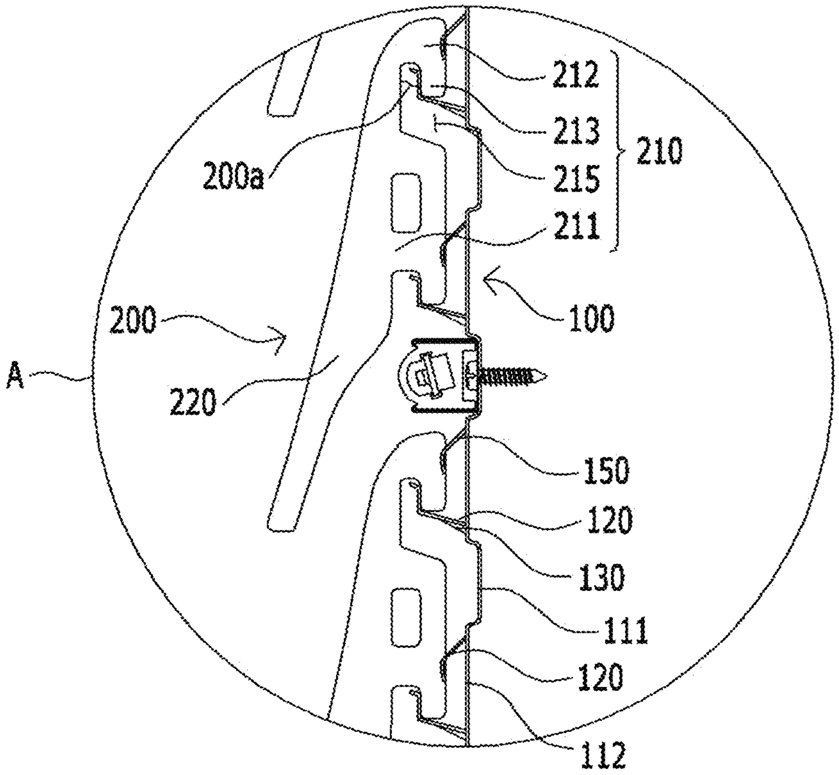
FIG. 6 is a view showing part A shown in FIG. 5.
Figure 7:
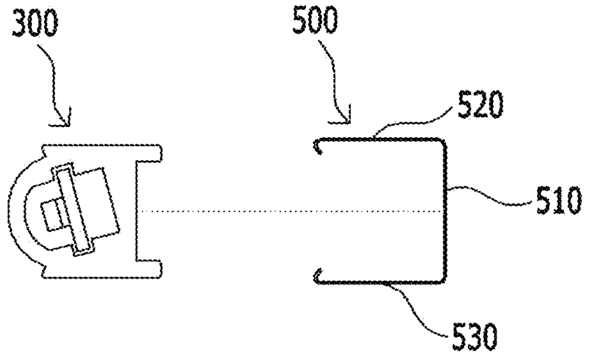
FIG. 7 shows the LED and mounting bracket shown in FIG. 6.

FIG. 5 shows a system for dry execution of finishing material according to another embodiment of the present invention, and FIG. 6 is a view showing part A shown in FIG. 5, and FIG. 7 shows the LED and mounting bracket shown in FIG. 6.

Referring to FIGS. 5 to 7, the system 10 for dry execution of finishing material according to another embodiment of the present invention may be provided with a fixing bracket fixed to an outer wall of a building 20, and a brick 200 which is provided on one surface of the fixing bracket and of which one surface facing the fixing bracket an insertion groove 200 a is formed in to be coupled into the fixing bracket in a fitting manner.

The fixing bracket 100 is used to fix the brick 200 by a dry method and may be manufactured through a method such as PVC injection or aluminum extrusion and fixed to the outer wall of the building 20.

A plurality of bricks 200 are provided in the fixing bracket 100 to cover the fixing bracket 100 fixed to the outer wall of the building 20 and may be formed in a terracotta manner.

The terracotta brick 200 is obtained by extruding clay into a predetermined shape and firing at a high temperature of about 1,000 to 1,450° C.

Accordingly, it not only has excellent aesthetics and formability, but also its materials are abundant and homogeneous, so it can replace natural stone finishing materials, and at least one hollow part (no reference number assigned) may be formed therein to reduce weight.

In addition, one surface of the fixing bracket 100 is provided with an LED 300 configured to be positioned between a pair of vertically adjacent bricks 200 and emitting light, and the light emitted from the LED 300 can be indirectly illuminated by the brick 200.

First, explaining about the brick 200 in detail, the brick 200 may comprise the first coupling part 210 in which an insertion groove 200*a* is formed therein and which is coupled to the fixing bracket 100, and a second coupling part 220 which is provided to correspond to the first coupling part 210 and allows light emitted from the LED 300 to be reflected.

The first coupling part 210 may be provided with a body 211 elongated in the vertical direction, and a plurality of first extending protrusions 212 extending toward the fixing bracket 100 to form a vertical line with the body 211 on one surface of the fixing bracket side 100 of the body 211, and a plurality of first coupling protrusions 213 extending downward from one end of the first extending protrusions 212 and forming a vertical line with the first extending protrusion 212, and an opening 215 formed between the first coupling protrusion 213 and the first extending protrusion 212 to allow a portion of the fixing bracket 100 to be inserted into the insertion groove 200*a*.

The length of the body 211 may be provided in various lengths such as 95 mm to 195 mm depending on the overall size of the brick 200, and the number of the first extending protrusion 212 and the first coupling protrusion 213 may increase or decrease depending on the length of the body 211.

Here, the insertion groove 200*a* and the opening 215 are always provided in the same size regardless of the length of the body 211 and the number of the first extending protrusions 212 and the first coupling protrusions 213, so that it can be easily combined with the fixing bracket 100 regardless of the size of the brick 200.

The second coupling part 220 is provided in a form of extending downward from the body 211, and is configured such that the second coupling part 220 of the brick 200 located on the relatively upper side covers the upper end of brick 220 located on the relatively lower side and the LED 300, and as the LED 300 is covered by the second coupling part 220, it is blocked from being exposed to the outside, thereby it can be blocked from being exposed to rainwater or direct sunlight in case of rain.

On the other hand, the fixing bracket 100 may comprise a fixing plate which is provided with a plurality of flat portions 111 provided in a plate shape and is provided with a projection 112 extending from the flat portion 111 to be positioned between the plurality of flat portions 111 and protruding in a direction of a building 20 relatively more than the flat portion 111, an insertion protrusion 120 provided on one side of the brick 200 side of the projection 112 and inserted into the insertion groove 200*a*, an elastic body 130 provided on one side of the brick 200 side of the projection 112 so as to be located at a lower end of the insertion protrusion 120 and elastically supporting the insertion protrusion 120, a first pressure protrusion 150 which is provided on one side of the brick 200 side of the projection 112 so as to be located at an upper end of the insertion protrusion 120 and which comes in contact with the first extending protrusion 212 to push the brick 200 in an outer direction the building 20, and a second pressure protrusion 160 which is provided on one side of the brick 200 side of another projection 112 so as to be located at a lower end of the insertion protrusion 120 and which comes in contact with another first extending protrusion 212 to push the brick 200 in an outer direction the building 20.

As the fixing plate 110 is provided alternately with the flat portion 111 and the projection 112, the structural rigidity can be relatively increased compared to the flat portion 111 alone, and the fixing plate 110 may be fixed to the building 20 by fastening to the flat portion 111 a fixing member (no reference number assigned) such as a piece or the like.

The insertion protrusion 120 is provided in a 'L' shape and is inserted through the opening 215, and then is seated in the insertion groove 200*a* and abuts one surface of the insertion groove 200*a* side of the first coupling protrusion 213, and supports the bottom surface so that the brick 200 is configured to rest on the fixing bracket 100 by the insertion protrusion 120, and the insertion protrusion 120 can be moved elastically by the elastic body 130 when an impact is applied to the brick 200, thus damage of the fixing bracket 100 or the brick 200 can be reduced.

The first pressure protrusion 150 and the second pressure protrusion 160 exert a force to push the brick 200 outward of the building 20, thereby increasing the bonding strength of the brick 200 together with the insertion protrusion 120.

On the other hand, a system 10 for dry execution of finishing material according to an embodiment of the present invention may further include a mounting bracket 500 provided between a pair of adjacent bricks 200 to which the LED 300 is mounted.

The mounting bracket 500 may comprise a first portion 510 in contact with the flat portion 111, a second portion 520 extending from an upper end of the first portion 510, and a third portion 530 extending from a lower end of the first portion 510, thereby it may be provided in a '⊏' shape.

It is configured that the first portion 510 is fixed to the fixing bracket 100 by a fixing member (no reference number assigned) such as a piece fastened to the flat portion 111, and the LED 300 is inserted into the inner space of the mounting bracket 500.

And, the second portion 520 and the third portion 530 have some elasticity, and protrusions (no reference number assigned) that protrude toward the LED 300 are provided respectively at one end of the second portion 520 and the third portion 530 to allow the LED 300 to be coupled to the mounting bracket 500 in a fitting manner as well as to prevent the LED 300 from being separated from the mounting bracket 500 after being coupled.

As described above, as the mounting bracket 500 is provided, the LED 300 can be stably fixed to the fixing bracket 100, and maintenance such as replacement and repair of the LED 300 can be easily performed.

Next, a modified example of the system 10 for dry execution of finishing material according to another embodiment of the present invention will be described. In the following description, only parts different from those of the above-described embodiment are described in detail, and detailed descriptions of the same or extremely similar parts are omitted.

Figure 8:
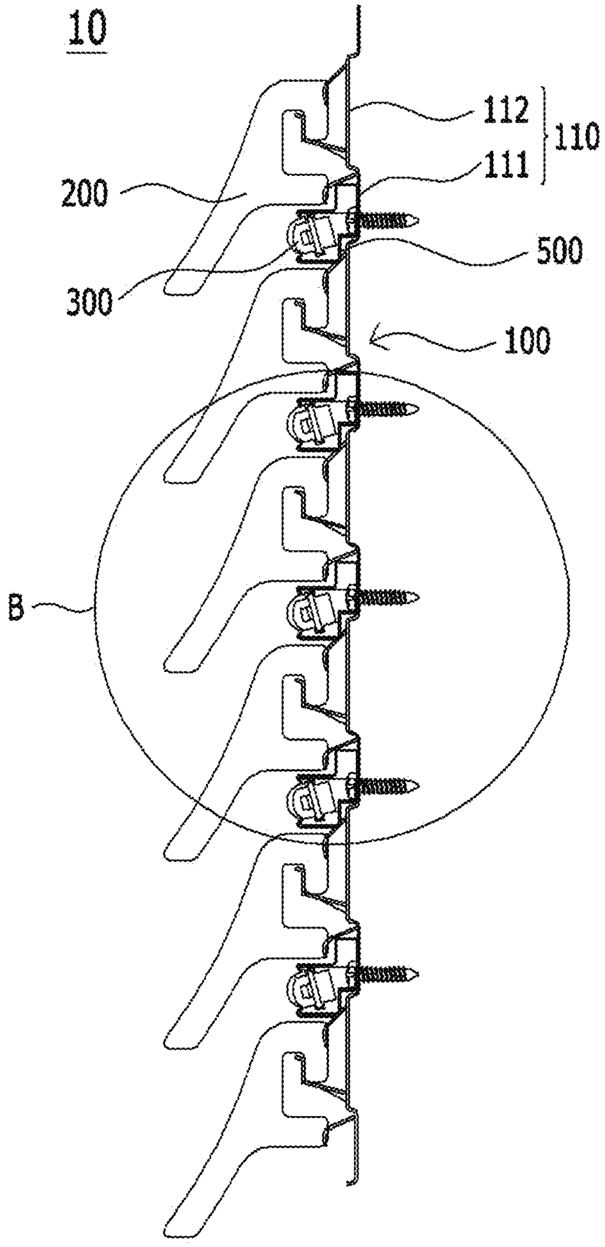
FIG. 8 is a view showing a modified example of the system for dry execution of finishing material shown in FIG. 5.
Figure 9:
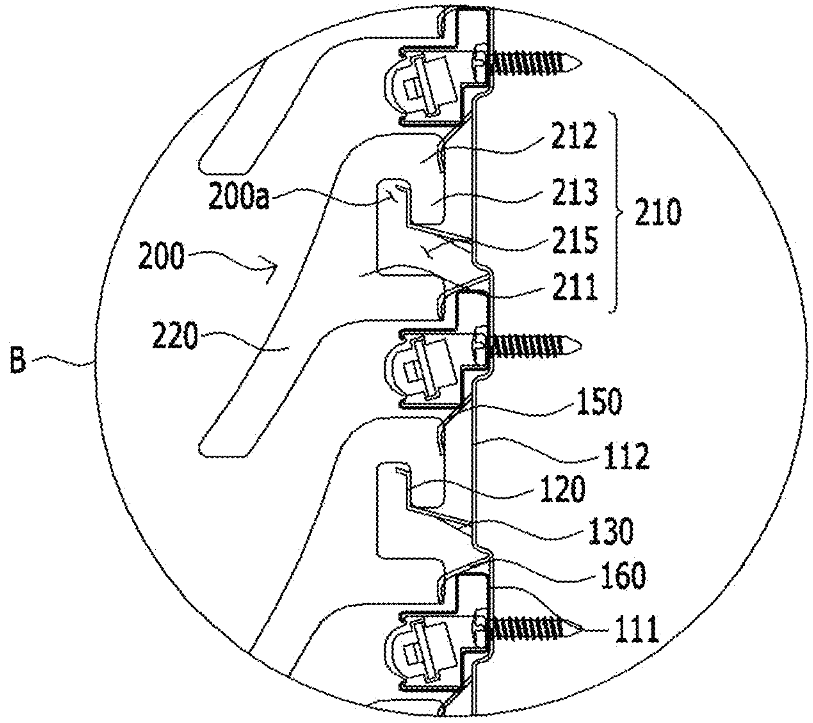
FIG. 9 is a view showing part B shown in FIG. 8.
Figure 10:
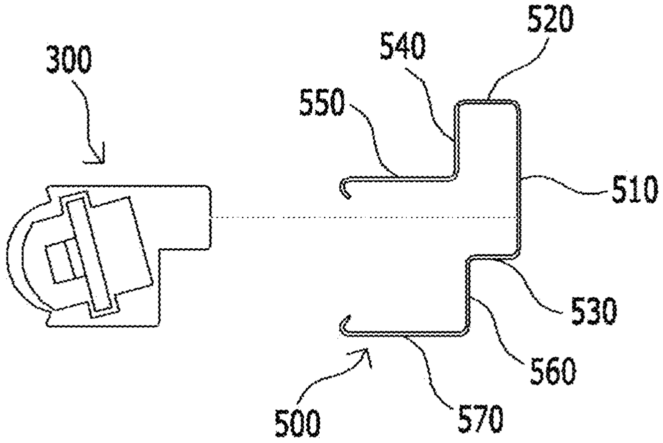
FIG. 10 shows the LED and mounting bracket shown in FIG. 9.

FIG. 8 is a view showing a modified example of the system for dry execution of finishing material shown in FIG. 5, and FIG. 9 is a view showing part B shown in FIG. 8, and FIG. 10 shows the LED and mounting bracket shown in FIG. 9.

Referring to FIGS. 8 to 10, the fixing bracket 100 of the system 10 for dry execution of finishing material according to another embodiment of the present invention may comprise a fixing plate 110 which is provided with a plurality of flat portions 111 provided in a plate shape and is provided with a projection 112 extending from the flat portion 111 to be positioned between the plurality of flat portions 111 and protruding in a direction of a building 20 relatively more than the flat portion 111, and an insertion protrusion 120 provided on one side of the brick 200 side of the projection 112 and inserted into the insertion groove 200*a*, and an elastic body 130 provided on one side of the brick 200 side of the projection 112 so as to be located at a lower end of the insertion protrusion 120 and elastically supporting the insertion protrusion 120, and a first pressure protrusion 150 which is provided on one side of the brick 200 side of the projection 112 so as to be located at an upper end of the insertion protrusion 120 and which comes in contact with the first extending protrusion 212 to push the brick 200 in an outer direction the building 20, and a second pressure protrusion 160 which is provided on one side of the brick 200 side of the flat portion 111 so as to be located at a lower end of the insertion protrusion 120 and which comes in contact with another first extending protrusion 212 to push the brick 200 in an outer direction the building 20.

In addition, the system 10 for dry execution of finishing material according to an embodiment of the present invention may further comprise a mounting bracket 500 provided between a pair of the adjacent bricks 200 to which the LED 300 is mounted. The mounting bracket 500 may comprise a first portion 510 in contact with the flat portion 111, a second portion 520 extending from an upper end of the first portion 510 and located at a lower portion of the second pressure protrusion 160, a third portion 530 extending from a lower end of the first portion 510, a fourth portion 540 extending downward from the second portion 520, a fifth portion 550 extending toward the brick 200 from the fourth portion 540; a sixth portion 560 extending downward from the third portion 530, and a seventh portion 570 extending toward the brick 200 from the sixth portion 560.

The first portion 510 to the seventh portion 570 allow the mounting bracket 500 to be provided in a bent form so that the mounting bracket 500 can be easily fixed and the LED 300 can be easily mounted according to the size of the brick 200.

In one embodiment of the present invention, the mounting bracket 500 has been explained as including the first portion 510 to the seventh portion 570, but the mounting bracket 500 is not limited thereto, and depending on the installation environment such as the size of the brick 200, etc. additional portions to the seventh portion 570 may be provided.

In the above, a system for dry execution of finishing material according to another embodiment of the present invention was described, but technical spirit of the invention cannot be limited by examples disclosed herein. And those skilled in the art that understand technical spirit of the invention can easily suggest other examples by adding, changing, deleting, appending, etc. components within the same scope of technical spirit, and they will also belong to the scope of technical spirit of the invention.

What is claimed is:

1. A system for dry execution of finishing material comprising:

a fixing bracket fixed to an outer wall of a building;

a brick which is provided on one surface of the fixing bracket and of which one surface facing the fixing bracket an insertion groove is formed in to be coupled into the fixing bracket in a fitting manner; and an LED provided on the brick to emit light;

wherein the brick comprises a first coupling part which the insertion groove is formed and coupled to the fixing bracket; and a second coupling part which is provided to correspond to the first coupling part and in which the LED is embedded;

wherein the first coupling part comprises a body formed longitudinally in an up and down direction;

a plurality of first extending protrusions extending toward the fixing bracket so as to form a vertical line with the body from one surface of the fixing bracket of the body;

a plurality of first coupling protrusions extending downward from one end of the plurality of first extending protrusions and forming a vertical line with the plurality of first extending protrusions;

a plurality of second coupling protrusions extending upward from one end of the plurality of first extending protrusions and forming a vertical line with the plurality of first extending protrusions; and an opening formed between a first coupling protrusion of the plurality of first coupling protrusions and a second coupling protrusion of the plurality of second coupling protrusions that are facing each other to allow a portion of the fixing bracket to be inserted into the insertion groove;

wherein the second coupling part comprises a pair of second extending protrusions provided respectively at an uppermost end and a lowermost end of the body and extending in a direction corresponding to the plurality of first extending protrusions;

a pair of third extending protrusions extending upward or downward from one end of the plurality of second extending protrusions to form a vertical line with the plurality of second extending protrusions; and a coupling space formed by the body, the pair of second extending protrusions and the pair of third extending protrusions, wherein the LED is provided on an upper surface of the second extending protrusion provided at a lowermost end of the body, and wherein an upper part of the LED is provided with a light receiving plate for receiving light emitted from the LED.

2. A system for dry execution of finishing material comprising:

a fixing bracket fixed to an outer wall of a building;

a brick which is provided on one surface of the fixing bracket and of which one surface facing the fixing bracket an insertion groove is formed in to be coupled into the fixing bracket in a fitting manner; and an LED provided on the brick to emit light;

wherein the brick comprises a first coupling part which the insertion groove is formed and coupled to the fixing bracket; and a second coupling part which is provided to correspond to the first coupling part and in which the LED is embedded;

wherein the first coupling part comprises a body formed longitudinally in an up and down direction;

a plurality of first extending protrusions extending toward the fixing bracket so as to form a vertical line with the body from one surface of the fixing bracket of the body;

a plurality of first coupling protrusions extending downward from one end of the plurality of first extending protrusions and forming a vertical line with the plurality of first extending protrusions;

and an opening formed between a first coupling protrusion of the plurality of the first coupling protrusions and a first extending protrusion of the plurality of first extending protrusions to allow a portion of the fixing bracket to be inserted into the insertion groove;

wherein the second coupling part comprises a second extending protrusion provided at an uppermost end of the body and extending in a direction corresponding to the plurality of first extending protrusions;

a third extending protrusion extending downward from one end of the second extending protrusion to form a vertical line with the second extending protrusion;

a coupling space which is provided on an inner surface where the second extending protrusion and the third extending protrusion come into contact with each other and in which the LED is provided; and a front reflective surface which is provided to be inclined on one side of the body to reflect light emitted from the LED.

3. A system for dry execution of finishing material comprising:

a fixing bracket fixed to an outer wall of a building;

a brick which is provided on one surface of the fixing bracket and of which one surface facing the fixing bracket an insertion groove is formed in to be coupled into the fixing bracket in a fitting manner; and an LED provided on the brick to emit light;

wherein the brick comprises a first coupling part which the insertion groove is formed therein to be combined with the fixing bracket, and of which upper end is provided with the LED, and wherein the first coupling part comprises a body formed longitudinally in an up and down direction; a plurality of first extending protrusions extending toward the fixing bracket so as to form a vertical line with the body from one surface of the fixing bracket of the body; a plurality of first coupling protrusions extending downward from one end of the plurality of first extending protrusions and forming a vertical line with the plurality of first extending protrusions; an opening formed between a first coupling protrusion of the plurality of the first coupling protrusions and a first extending protrusion of the plurality of first extending protrusions to allow a portion of the fixing bracket to be inserted into the insertion groove; a seating protrusion extending upward from the first coupling protrusion located at an uppermost end; a seating space which is provided on an inner surface where the body and the seating protrusion come into contact with each other and which the LED is coupled with; and a rear reflection surface that extends from a lower end of the body to an outside of the brick and reflects light emitted from the LED provided in another brick adjacent to a lower direction.

4. The system for dry execution of finishing material according to claim 3, wherein the fixing bracket comprises a fixing plate which is provided with a plurality of flat portions provided in a plate shape and is provided with a projection extending from the plurality of flat portions to be positioned between the plurality of flat portions and protruding in a direction of a building relatively more than the plurality of flat portions;

an insertion protrusion provided on one side of the brick side of the plurality of flat portions and inserted into the insertion groove;

an elastic body provided on one side of the brick side of the plurality of flat portions so as to be located at a lower end of the insertion protrusion and elastically supporting the insertion protrusion; and a pressure protrusion which is provided on one side of the brick side of the plurality of flat portions so as to be located at an upper end of the insertion protrusion and which comes in contact with the plurality of first coupling protrusions to push the brick in an outer direction the building.

5. A system for dry execution of finishing material comprising:

a fixing bracket fixed to an outer wall of a building;

a brick which is provided on one surface of the fixing bracket and of which one surface facing the fixing bracket an insertion groove is formed in to be coupled into the fixing bracket in a fitting manner; and an LED provided on one surface of the fixing bracket and positioned between a pair of the bricks that are vertically adjacent to each other to emit light;

wherein the brick comprises a first coupling part which the insertion groove is formed and coupled to the fixing bracket; and a second coupling part which is provided to correspond to the first coupling part and allows light emitted from the LED to be reflected;

wherein the first coupling part comprises a body formed longitudinally in an up and down direction;

a plurality of first extending protrusions extending toward the fixing bracket so as to form a vertical line with the body from one surface of the fixing bracket of the body;

a first coupling protrusion extending downward from one end of the plurality of first extending protrusions and forming a vertical line with the plurality of first extending protrusions; and an opening formed between the plurality of first extending protrusions and the first coupling protrusion to allow a portion of the fixing bracket to be inserted into the insertion groove;

wherein the fixing bracket comprises a fixing plate which is provided with a plurality of flat portions provided in a plate shape and is provided with a projection extending from the plurality of flat portions to be positioned between the plurality of flat portions and protruding in a direction of a building relatively more than the plurality of flat portions;

an insertion protrusion provided on one side of the brick side of the projection and inserted into the insertion groove;

an elastic body provided on one side of the brick side of the projection so as to be located at a lower end of the insertion protrusion and elastically supporting the insertion protrusion;

a first pressure protrusion which is provided on one side of the brick side of the projection so as to be located at an upper end of the insertion protrusion and which comes in contact with the first extending protrusion to push the brick in an outer direction the building; and a second pressure protrusion which is provided on one side of the brick side of another projection so as to be located at a lower end of the insertion protrusion and which comes in contact with another first extending protrusion to push the brick in an outer direction the building.

6. The system for dry execution of finishing material according to claim 5, wherein a mounting bracket provided between a pair of the adjacent bricks to which the LED is mounted is further provided, the mounting bracket comprises a first portion in contact with the plurality of flat portions;

a second portion extending from an upper end of the first portion; and a third portion extending from a lower end of the first portion.

7. The system for dry execution of finishing material according to claim 5, wherein the fixing bracket comprises a fixing plate which is provided with a plurality of flat portions provided in a plate shape and is provided with a projection extending from the plurality of flat portions to be positioned between the plurality of flat portions and protruding in a direction of a building relatively more than the plurality of flat portions;

an insertion protrusion provided on one side of the brick side of the projection and inserted into the insertion groove;

an elastic body provided on one side of the brick side of the projection so as to be located at a lower end of the insertion protrusion and elastically supporting the insertion protrusion;

a first pressure protrusion which is provided on one side of the brick side of the projection so as to be located at an upper end of the insertion protrusion and which comes in contact with the plurality of first extending protrusions to push the brick in an outer direction the building; and a second pressure protrusion which is provided on one side of the brick side of the plurality of flat portions so as to be located at a lower end of the insertion protrusion and which comes in contact with another first extending protrusion to push the brick in an outer direction the building.

8. The system for dry execution of finishing material according to claim 7, wherein a mounting bracket provided between a pair of the adjacent bricks to which the LED is mounted is further provided, the mounting bracket comprises a first portion in contact with the plurality of flat portions;

a second portion extending from an upper end of the first portion and located at a lower portion of the second pressure protrusion;

a third portion extending from a lower end of the first portion;

a fourth portion extending downward from the second portion;

a fifth portion extending toward the brick from the fourth portion;

a sixth portion extending downward from the third portion; and a seventh portion extending toward the brick from the sixth portion.

* * * * *